March 9, 1943. T. B. ROBERTS ET AL 2,313,670
PICKUP ATTACHMENT FOR HARVESTING IMPLEMENTS
Filed May 5, 1941 4 Sheets-Sheet 1
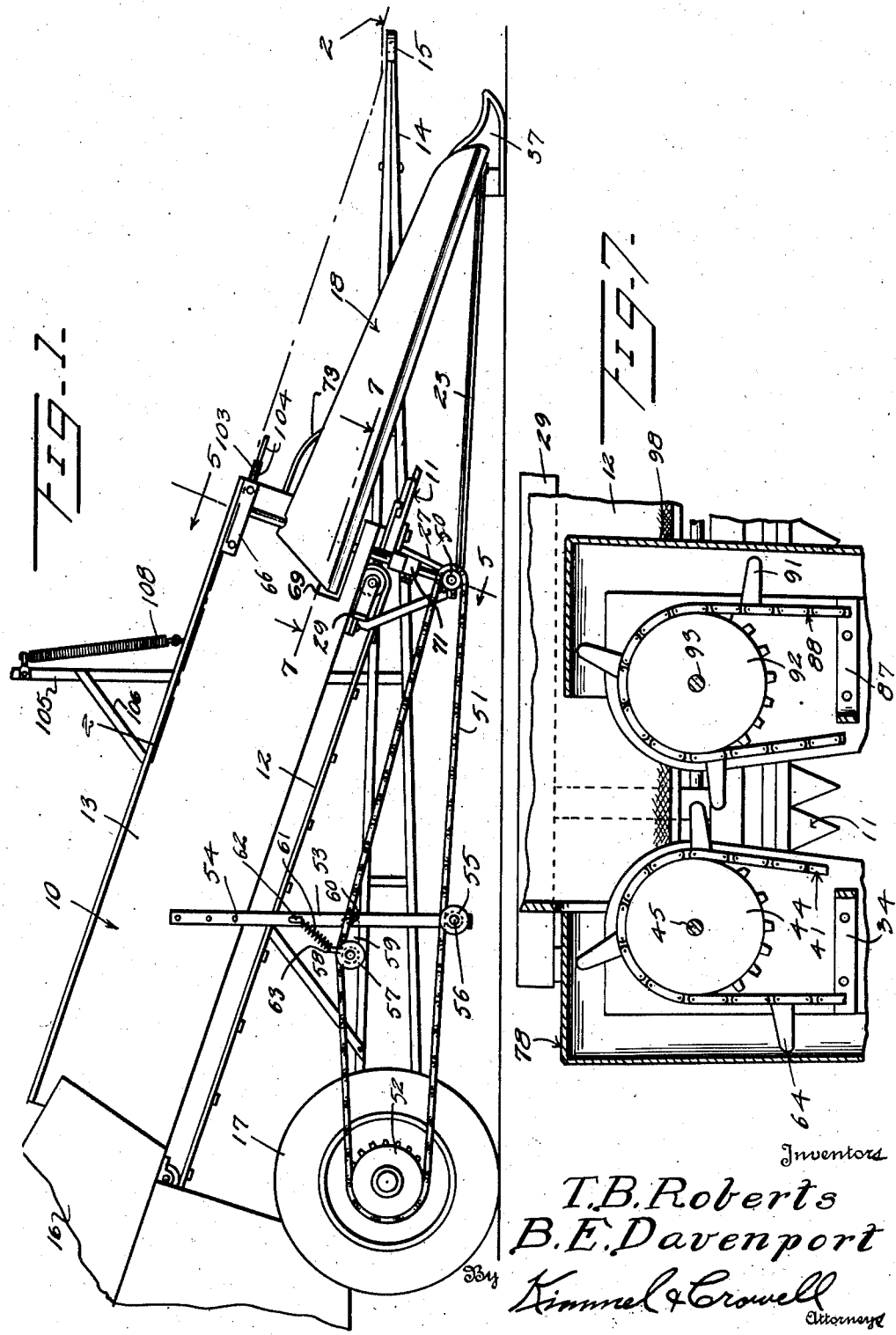

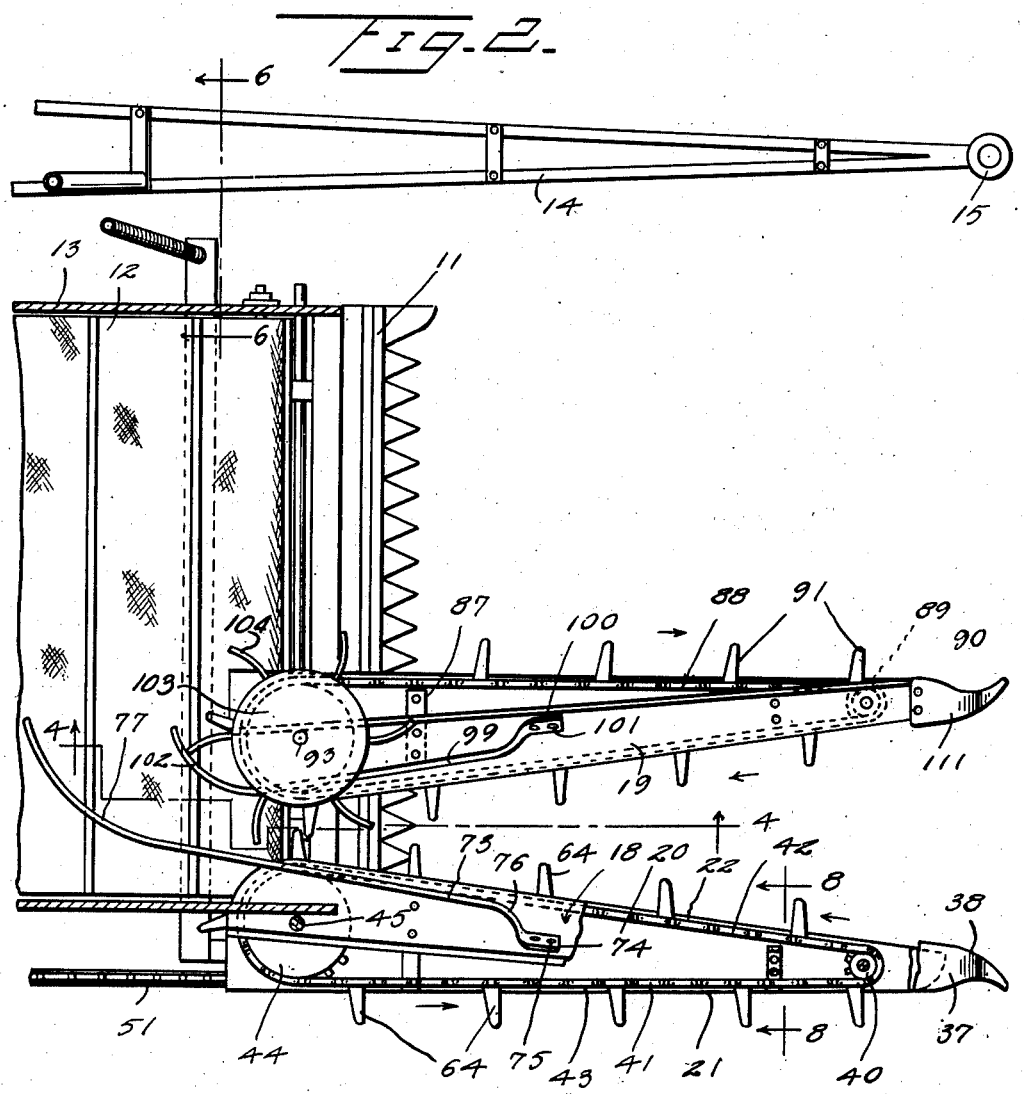

March 9, 1943.  T. B. ROBERTS ET AL  2,313,670
PICKUP ATTACHMENT FOR HARVESTING IMPLEMENTS
Filed May 5, 1941  4 Sheets-Sheet 3
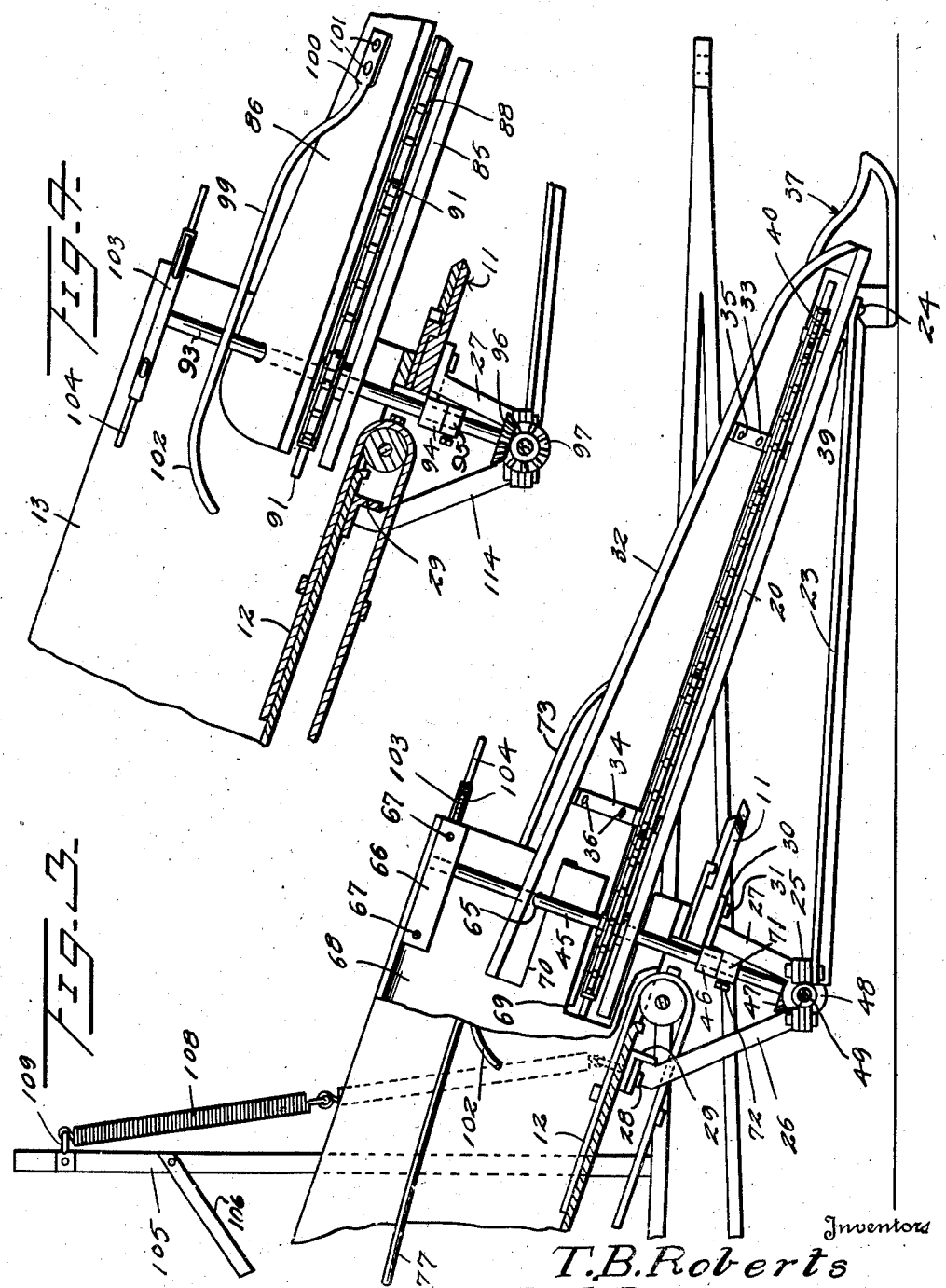
Inventors
T. B. Roberts
B. E. Davenport
By Kimmel & Crowell
Attorneys March 9, 1943.  T. B. ROBERTS ET AL  2,313,670
PICKUP ATTACHMENT FOR HARVESTING IMPLEMENTS
Filed May 5, 1941  4 Sheets-Sheet 4
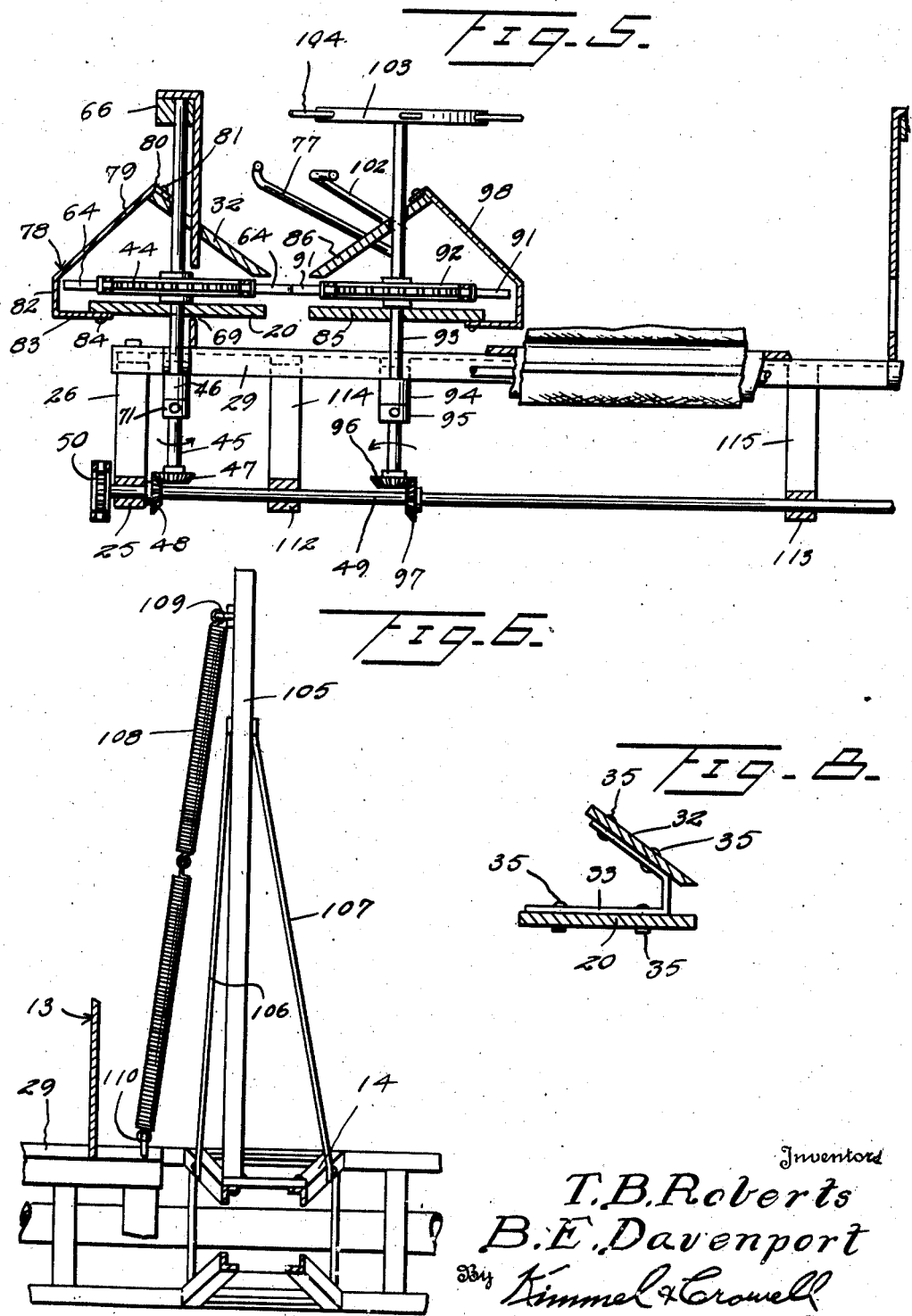
Inventors
T. B. Roberts
B. E. Davenport
By Kimmel & Crowell
Attorneys Patented Mar. 9, 1943

2,313,670

UNITED STATES PATENT OFFICE 2,313,670

PICKUP ATTACHMENT FOR HARVESTING IMPLEMENTS

Turney B. Roberts and Bascomb E. Davenport, Memphis, Tex.

Application May 5, 1941, Serial No. 391,990

7 Claims. (Cl. 56—312)

This invention relates to harvesting implements and more particularly an attachment for a combine for picking up grain or the like which has been blown down or otherwise bent over.

While harvesting machines have been designed for cutting small grain, corn or the like while in standing position, these machines are ineffective in the cutting of grain, corn or other products when the products have been levelled to the ground by wind, rain, hail or the like, with the result that such products are frequently a total loss after a storm due to the inability of the cutters to come into contact with the product. It is, therefore, an object of this invention to provide an attachment which may be secured to a harvester and which is adapted to raise the products to substantially an upright position so that the harvester may cut the products in the normal manner.

Another object of this invention is to provide a pick-up attachment of this kind which is operated from a wheel of the harvester as the harvester moves along the ground.

A further object of this invention is to provide a pick-up attachment of this kind which may be easily and quickly mounted on or removed from a harvester and which will not affect the normal operation of the harvester, so that the attachment may be applied to the harvester only when the need therefor arises.

A further object of this invention is to provide an attachment of this kind which includes a pair of product raising arms which are secured to and which extend forwardly from the cutter of the harvester.

A further object of this invention is to provide an attachment of this kind which not only includes elevating arms for raising the grain, but also includes means for holding the grain upright until it has been cut.

A further object of this invention is to provide an attachment of this kind including a pair of endless carriers having projecting fingers which are movable rearwardly toward the cutters so that the grain will be thereby held upright until the cutter comes into contact therewith, and the grain is then subsequently directed to the conveyor forming part of the harvester.

To the foregoing objects and to others which may hereinafter appear, the invention consists of the novel construction, combination and arrangement of parts as will be more specifically refered to and illustrated in the accompanying drawings wherein is shown an embodiment of the invention, but it is to be understood that changes, variations and modifications may be resorted to which fall within the scope of the invention as claimed.

In the drawings:

Figure 1 is a detail side elevation partly broken away of a harvest implement or combine having a pick-up attachment mounted thereon which is constructed according to an embodiment of this invention, Figure 2 is a fragmentary top plan partly in section taken on line 2—2 of Figure 1, of the forward end of the combine and the attachment, Figure 3 is a fragmentary side elevation partly in section and with the outer cover of one pick-up member removed, Figure 4 is a fragmentary sectional view taken on the line 4—4 of Figure 2, Figure 5 is a sectional view taken on the line 5—5 of Figure 1, Figure 6 is a sectional view taken on the line 6—6 of Figure 2, Figure 7 is a fragmentary sectional view taken on the line 7—7 of Figure 1, and Figure 8 is a fragmentary sectional view taken on the line 8—8 of Figure 2.

Referring now to the drawings, the numeral 10 designates generally a combine or harvester structure which includes a cutter bar 11 mounted on the forward end of an upwardly and rearwardly inclined elevator structure including a chute 13 having an endless conveyor 12 moving on its upper run upwardly and rearwardly of the cutter bar 11. The combine 10 also includes a draw bar structure 14 having a coupling member 15 at its forward end which is adapted to be connected with a tractor or the like. A grain separating or treating member 16 is connected with the upper rear end of the elevator structure and extends rearwardly of supporting wheels 17, which are rotatably carried by the frame structure for the combine or harveter 10.

In order to provide a means whereby the grain which has been levelled by storms including high winds, rain, hail or the like may be raised to a substantially upright position so that the cutter bar 11 may cut the stalks of the grain as the harvester moves over the ground, we have provided a pick-up attachment, as will be hereinafter described, which is mounted on and extends forwardly of the elevator structure.

The pick-up attachment includes a pair of forwardly directed, forwardly divergent and downwardly extending pick-up members generally designated as 18 and 19. The pick-up member 18 includes a flat plate or frame member 20 which in plan is substantially V-shape with an outer edge 21 thereof disposed substantially parallel with the chute 13. The inner edge 22 of the plate 20 is disposed in a forwardly and outwardly inclined position and the plate 20 at its forward end is supported by means of a combined bracing and supporting bar 23, which is secured to the under side of the plate 20 by fastening devices 24. The rear end of the brace or supporting member 23 is secured to a bearing member 25, which is carried by a pair of hanger arms 26 and 27. The arm 26 extends upwardly and rearwardly from the bearing structure 25 and is secured at its upper end as by fastening devices 28 to a transversely extending angle bar or frame member 29 forming part of the frame of the chute structure. The hanger or bearing supporting arm 27 is provided at its upper end with a base plate 30 secured as by a fastening device 31 to the under side of the stationary portion of the cutter bar 11.

The plate 20 has secured thereto an upwardly and outwardly directed combined guiding member and guard plate 32. The plate 32 is supported with the lower inner edge thereof spaced upwardly from the inner edge 22 of the plate 20 by means of a plurality of substantially V-shaped bars 33 and 34, which are secured to the plates 20 and 32 by fastening devices 35 and 36. A combined guiding, supporting and stalk lifting shoe 37 is secured to the forward ends of the two plates 20 and 32 and is provided with an outwardly directed inner face portion 38, which is formed substantially as a continuation of the inner end portions of the two plates 20 and 32. A shaft 39 is carried by the forward end portion of the plate 20 and has rotatably mounted thereon a forward sprocket 40. A chain generally designated as 41 is trained about the sprocket 40 and has the inner and outer runs 42 and 43 respectively disposed substantially parallel with the inner and outer edges 28 and 21 respectively of the plate 20. The chain 41 is also trained about a substantially large sprocket 44, which is mounted on a vertical shaft 45.

The shaft 45 extends downwardly through the plate 20 and is journalled through a bearing 46 fixed to the under side of the cutter bar 11. A bevelled sprocket 47 is secured to the lower end of the shaft 45 and is adapted to mesh with a sprocket 48 mounted on a horizontally disposed drive shaft 49. The drive shaft 49 is journalled through the bearing 25 and extends horizontally below the forward end of the chute structure 13 and rearwardly of the cutter bar 11. The shaft 49 has secured to one end portion thereof a sprocket 50 about which an endless chain 51 engages. The chain 51 also engages about a sprocket 52, which is fixed relative to the wheel 17. In order to provide a means whereby the chain 51 may be maintained taut and maintained out of contact with the ground, we have provided a vertically disposed supporting bar 53 secured by fastening devices 54 to the chute structure 13. A lower idler pulley 55 is journalled on a shaft 56 carried by the lower end portion of the bar 53 and an upper idler and chain tensioning pulley 57 is mounted on a shaft 58 carried by a pivoted arm 59. The arm 59 is pivoted on a pivot member 60 engaging the bar 53. A chain tensioning spring 61 is secured as at 62 to the bar 53 and is secured as at 63 to the arm 59.

The chain 41 has secured thereto a plurality of longitudinally spaced apart fingers 64 which are adapted to project inwardly through the space between the two plates 20 and 32 in order to engage the stalks of the grain, which are sliding over the guiding plate 32. Preferably the rearward movement of the inner run 42 of the chain 41 is substantially equal to the forward movement of the tractor so that the grain stalks will be gradually raised to a substantially upright position as the combine 10 moves forwardly over the ground and the stalks engaging the guiding plate 32 will engage between pairs of inwardly directed fingers 64. The shaft 45 extends upwardly through an opening 65 formed in the plate 32 and the upper end portion of the shaft 45 is journalled in a bearing 66 secured by fastening devices 67 to the outer side of the chute 13. Preferably the side wall 68 of the chute 13 is formed with an elongated opening 69 through which the plate 20 extends and a similar opening 70 is provided above the opening 69 so that the rear portion of the plate 32 may be extended through the wall 68 of the chute 13. A collar 71 is secured by a fastening device 72 to the shaft 45 below the bearing 46 so as to thereby prevent upward movement of the shaft 45 during the rotation thereof.

A stalk guiding bar or arm 73 which is formed with a forward flat end portion 74 is secured by fastening devices 75 to the upper side of the plate or guide member 32 at a point forwardly of the rear end thereof. This bar or arm 73 extends upwardly as at 76 from the upper surface of the plate or guide member 32 and then extends rearwardly substantially parallel with the inner edge 22 of the plate 20 and terminates at its rear end portion in an arcuate and downwardly inclined guiding member 77. The outer run 43 of the chain 41 is adapted to be enclosed in a metal guard or covering generally designated at 78. The guard member 78 includes a flat guard plate 79 formed at its upper edge with a downwardly inclined flange 80 secured as by fastening devices 81 to the upper side of the guide member 32. The plate or guard member 78 is formed with a substantially vertical extension 82 which has formed integral with the lower edge thereof a right angularly disposed base plate 83 secured by fastening devices 84 to the under side of the plate 20.

The pick-up member 19 is constructed substantially identical to the construction of the pick-up member 18 and includes a base plate or frame member 85, which has disposed above the upper surface thereof a combined guard and guide plate 86. The plate 86 is supported above the base plate 85 by substantially V-shaped supporting members 87, which are similar to the supporting members 33 and 34. An endless chain structure 88 engages above the base plate 85 and is trained about a forward sprocket 89 rotatably carried by a shaft 90. The chain 88 is formed with a plurality of spaced apart guiding fingers 91 similar to the fingers 64 and the chain 88 is trained about a rear sprocket 92, which is fixed to a vertical shaft 93. The shaft 93 is journalled in a bearing 94 carried by the cutter bar 11 and a collar 95 is fixed to the shaft 93 and holds this shaft against endwise movement in an upward direction. A bevelled sprocket 96 is fixed to the lower end of the shaft 93 and is adapted to mesh with a bevelled gear 97 fixed to the shaft 49. A cover or guard member 98 similar to the cover or guard member 78 is secured by the two plates 85 and 86 and engages about the outer run of the chain 88. An upwardly offset rearwardly extending guiding arm or bar 99 having a flattened forward end portion 100 is fixed by fastening devices 101 to the upper side of the plate 86. The guiding member 99 is formed with an inwardly curved and downwardly directed rear end portion 102, which is adapted to overlie the forward portion of the elevator or conveyor 12 rearwardly of the cutter bar 11.

In order to provide a means whereby the stalks of the grain may be forced rearwardly of the cutter bar 11 after they have been cut and maintained in substantially an upright position, we have provided a rotatable wheel 103 which is fixed to the upper end of the shaft 93. The wheel 103 is provided with a plurality of outwardly directed and longitudinally curved arms 104, which are adapted to project into the space between the two guide members 73 and 99 and to be disposed thereabove for forcing the cut stalks rearwardly between the guide members 73 and 99 and onto the conveyor 12. The arms or fingers 104 are adapted to contact the stalks at a substantial distance above the lower or cut ends thereof, so as to swing the upper ends of the stalks rearwardly and downwardly in order that the stalks may contact with the upwardly and rearwardly moving conveyor 12.

The draft member 14 has secured thereto the lower end of a vertically disposed supported pole 105 and the pole 105 is braced in a vertical position by means of bracing members 106 and 107, which are secured at their lower ends to the draft member 14. A tensionable spring structure 108 is secured to an eye 109 carried by the pole 105 and the spring structure 108 is secured at its lower end to an eye 110 which is carried by the angle beam 29 at the end thereof opposite from the sprocket 50. The spring structure 108 is adapted to yieldingly hold the chute 13 with the cutter bar 11 at the desired spaced distance from the surface of the ground so that the shoe 38 at the forward end of the pick-up member 18 and the shoe 111 at the forward end of the pick-up member 19 may be disposed in substantial contact with the surface of the ground. The shoe 111 is constructed similar to the shoe 38, but is oppositely directed as shown in Figure 2.

In the use and operation of this pick-up attachment the forward end of the chute 13 of the combine or harvester 10 has the two pick-up members 18 and 19 fixedly secured thereto with the shaft 49 extending beneath the chute structure and journalled in bearings 112 and 113 carried by hangers 114 and 115 respectively. The bearings 112 and 113 are in addition to the bearings 25 and the bearing 112 is disposed between the two gears 48 and 97. The chain 51 is engaged with a gear 52 mounted on the wheel 17 so that as the harvester or combine 10 is moved over the surface of the ground the shaft 49 will be rotated. Rotation of the shaft 49 will effect rotation of the two vertical shafts 45 and 93 and effect rearward movement of the inner runs of the two chains 41 and 88 so that the fingers 64 and 91 carried by the chains will move rearwardly past the cutter bar 11. The shoes 37 and 111 will initially raise the stalks of the grain so that the stalks will ride upwardly over the guide members 32 and 86 and these stalks will be held in a substantially upright position by means of the fingers 64 and 91.

After the stalks have been cut the fingers or arms 104 carried by the wheel 103 will incline the upper portions of the stalks rearwardly and downwardly so that the stalks will fall on the upper surface of the elevator 12. The stalks will then be carried upwardly by the elevator 12 for engagement with the grain removing or treating structure 16, which is at the upper rear end of the elevator 12.

The pick-up members 18 and 19 are designed as an attachment for a conventional combine or harvester so that when the grain has been levelled by storms or the like, the grain will not be lost to the farmer but may be raised and harvested by attaching the pick-up members 18 and 19 onto the forward end of the combine.

It is to be understood that the term "grain" as used herein includes the small grains, and corn or other products having stalks which normally rise above the ground and are harvested by means of a harvester having a reciprocating cutter or the like.

In the cutting of broadcast grains or the like, the machine would be driven spirally of the field with the cutter and pick-up member to the inside. Each swath cut would be the width of the pick-up device.

What we claim is:

1. A pick-up attachment for harvesters comprising a pair of forwardly divergent members, means mounting said members on the harvester in forwardly extended position from the cutter bar, a combined supporting shoe and grain elevating member carried by the forward end of each member, rearwardly movable fingers carried by each member, a pair of rearwardly converging rearwardly directed guide members carried one by each of said first members, the outer guide member of said pairs of guide members extending substantially further rearwardly than the inner guide member, and a rotatable guide carried by one of said first members and including means correlated with said guide members for maintaining the grain upright and moving the grain rearwardly of the cutter bar in a substantially upright position.

2. A pick-up attachment for harvesters comprising a pair of forwardly divergent members, means mounting said members on the harvester in forwardly extended position from the cutter bar, a combined supporting shoe and grain elevating member carried by the forward end of each member, rearwardly movable fingers carried by each member, a pair of rearwardly converging rearwardly directed guide members carried one by each of said first members, the outer guide member of said pairs of guide members extending substantially further rearwardly than the inner guide member, and a rotatable guide carried by one of said first members and including means correlated with said guide members for maintaining the grain upright and moving the grain rearwardly of the cutter bar in a substantially upright position, said latter means including a horizontally rotatable wheel and outwardly arms carried by said wheel.

3. A pick-up attachment for harvesters comprising a pair of forwardly divergent members, means mounting said members on the harvester in forwardly extended position from the cutter bar, a combined supporting shoe and grain elevating member carried by the forward end of each member, rearwardly movable fingers carried by each member, a pair of rearwardly converging rearwardly directed guide members carried one by each of said first members, the outer guide member of said pairs of guide members extending substantially further rearwardly than the inner guide member, and a rotatable guide carried by one of said first members and including means correlated with said guide members for maintaining the grain upright and moving the grain rearwardly of the cutter bar in a substantially upright position said latter means including a horizontally rotatable wheel and outwardly extending and longitudinally bent arms carried by said wheel.

4. A pick-up attachment for harvesters of the type having a grain cutter, comprising a pair of forwardly divergent members, means mounting said members on the harvester in forwardly extended position from the cutter bar, a combined supporting shoe and grain elevating member carried by the forward end of each member, rearwardly movable fingers carried by each member, a pair of rearwardly converging rearwardly directed guide members carried one by each of said first members, said guide members having their rear portions downwardly and inwardly directed whereby the grain is guided toward the center of the machine the outer guide member of said pairs of guide members extending substantially further rearwardly than the inner guide member, and a rotatable guide carried by one of said first members and including means correlated with said guide members for maintaining the grain upright and moving the grain rearwardly of the cutter bar in a substantially upright position.

5. A pick-up attachment for harvesters of the type having a grain cutter comprising a pair of forwardly divergent members, means mounting said members on the harvester in forwardly extended position from the cutter bar, a combined supporting shoe and grain elevating member carried by the forward end of each member, rearwardly movable fingers carried by each member, a pair of rearwardly converging rearwardly directed guide members carried one by each of said first member, the outer guide member of said pair of guide members extending substantially further rearwardly than the inner guide member, a rotatable guide carried by one of said members at the rear of said member, said guide being positioned rearwardly of said cutter and means correlated with said guide members for maintaining the grain upright and moving the grain rearwardly of the cutter bar in a substantially upright position.

6. A pick up attachment for harvesters of the type having a grain cutter comprising a pair of forwardly divergent members, means mounting said members on the harvester in forwardly extended position from the cutter bar, a combined supporting shoe and grain elevating member carried by the forward end of each member, rearwardly movable fingers carried by each member, a pair of rearwardly converging rearwardly directed guide members carried one by each of said first member, said guide members having their rear portions downwardly and inwardly directed whereby the grain is guided toward the center of the machine, the outer guide member of said pair of guide members extending substantially further rearwardly than the inner guide member, a rotatable guide carried by one of said members at the rear of said member, said guide being positioned rearwardly of said cutter, and means correlated with said guide members for maintaining the grain upright and moving the grain rearwardly of the cutter bar in substantially upright position.

7. A pick-up attachment for harvesters of the type having a grain cutter comprising a pair of forwardly divergent members, means mounting said members on the harvester in forwardly extended position from the cutter bar, a combined supporting shoe and grain elevating member carried by the forward end of each member, rearwardly movable fingers carried by each member, a pair of rearwardly converging rearwardly directed guide members carried one by each of said first members, said guide members having their rear portions downwardly and inwardly directed whereby the grain is guided toward the center of the machine, the outer guide member of said pair of guide members extending substantially further rearwardly than the inner guide member, a rotatable guide carried by one of said members at the rear of said member, said guide being positioned rearwardly of said cutter, and means correlated with said guide members for maintaining the guide upright and moving the grain rearwardly of the cutter bar in a substantially upright position, said rearwardly projecting guide members being positioned lower than and in part beneath said rotatable guide members.

BASCOMB E. DAVENPORT.
TURNEY B. ROBERTS.